United States Patent [19]
McNeice et al.

[11] Patent Number: 5,200,077
[45] Date of Patent: Apr. 6, 1993

[54] BACKFLUSHABLE ROTARY MELT POLYMER FILTER APPARATUS

[75] Inventors: Raymond R. McNeice, De Bary; Royal R. Swanson, DeLand, both of Fla.

[73] Assignee: Memtec America Corporation, Timonium, Md.

[21] Appl. No.: 681,736

[22] Filed: Apr. 8, 1991

[51] Int. Cl.[5] .............................................. B01D 33/00
[52] U.S. Cl. .................................. 210/323.2; 210/330; 210/333.1
[58] Field of Search ...................... 210/323.2, 324, 330, 210/333.01, 333.1, 359, 393, 411

[56] References Cited

U.S. PATENT DOCUMENTS

| 3,823,830 | 7/1974 | Hayafune | 210/330 |
| 4,486,304 | 12/1984 | Neuman et al. | 210/333.1 |
| 4,775,487 | 10/1988 | El-Saie | 210/330 |

OTHER PUBLICATIONS

"Melt Filtration Report", Issue 83-1, Apr./May 1983, G. F. Goodman & Son, Inc., Philadelphia, Pa.
"Filtration of Plastic Melts", Gneuss Inc., Kunststoffenchnik GmbH, Bad Oeynhause, Germany, 1988.
"Filtration of Plastic Melts", Gneuss Inc., Langhorne, Pa., unknown date.

Primary Examiner—Peter Hruskoci
Assistant Examiner—Robert James Popovics
Attorney, Agent, or Firm—Waldron & Associates

[57] ABSTRACT

A continuous, self-cleaning, rotary filtering apparatus is provided having a plurality of filter elements within a rotatable filter housing adapted for rotation between an inlet plate having an inlet manifold and an outlet plate having an outlet manifold so that the liquid to be filtered is passed from the inlet manifold through the filter elements and into the outlet manifold. The apparatus is further provided with a backflushing capability whereby the filter housing can be rotated to position where one filter element in alignment with a backflush port independent of the inlet manifold so that a part of the liquid within the outlet manifold will be caused to flow backward through that filter element and backflush port to purge contaminants from the apparatus via the backflush port without interrupting liquid flow through the other filter elements. After backflushing, the filter housing is further rotated to return the backflushed filter element to service.

18 Claims, 7 Drawing Sheets

BACKFLUSHABLE ROTARY MELT POLYMER FILTER APPARATUS

BACKGROUND OF THE INVENTION

1. Field of the Invention

This invention relates generally to a rotary filter apparatus, and more particularly to a new and improved backflushable, rotary filter apparatus primarily intended for use in filtering high viscosity polymer hot melt feed stocks, which is capable of backflushing the filter surface areas to purge contaminants from the apparatus without interrupting the filtering operation. The filter apparatus of this invention provides a continuous, uninterrupted flow of the hot melt through a plurality of filter elements mounted within a rotatable housing such that the flow of hot melt is smooth, unrestricted and devoid of "dead spaces" where there could be "zero flow" thereby virtually eliminating thermal degradation of the hot melt. The filter housing can be periodically rotated to successively and automatically pass one filter element at a time through a backflush position to thereby automatically and sequentially backflush each filter element to purge filtered contaminates from the apparatus without removing the other filter elements from service or otherwise interrupting the filtering operation, and without the need for any valves to control the backflush operation.

2. Summary of the Prior Art

There are a number of manufacturing processes involving the formation of products from molten polymer feed stocks, such as nylon, polyesters and other polymers, wherein it is highly desirable to operate on a continuous flow basis. Such processes typically embody extrusion, injection, blow molding, coating spraying techniques, etc., to manufacture a variety of products, such as synthetic textile fibers, plastic tubing, plastic sheets and films, protective coatings, insulation on electrical wire, and the like. Because of the difficulties in initially starting up such processes and cleaning the equipment after a shut down, it is highly desirable to operate such processes on a continuous, uninterrupted flow basis for as long a period of time as can be sustained.

In most of the processes noted above, it is the usual practice to include a filter unit in the "hot melt" flow stream to effect removal of particulate impurities and gel matter which otherwise could result in the production of defective products, or which could cause clogging of downstream equipment such as spinnerettes or extrusion dies. Naturally, such filters must be cleaned or replaced on a periodic basis. Rather than shutting down the process to clean or replace such filters, it is common practice to utilize a dual filter system to permit continued, uninterrupted operation. That is, the process hot melt is routed through only one of the dual filter systems at a time so that the filter system not in use can be cleaned or replaced, and put in stand-by condition so that it can be put into service when it is time to shut down the other filter system for cleaning or replacement. A diverter valve must be provided to switch the hot melt flow from one filter system to the other.

More recently, self-cleaning filter systems have been introduced which offer fully automatic filter cleaning or changing without the need for any dual filter system, without any notable production delays, and without any operator involvement. One such filter apparatus described in *Melt Filtration Report*, Issue 83-1, April-May, G. F. Goodman and Sons, Inc., Philadelphia, Pa., utilizes a cylindrical pack of filter screens disposed between a pair of perforated, annular housing cylinders sharing a common axis. In this apparatus, the unfiltered hot melt is passed into an inlet manifold encircling the outer cylinder which is provided with a plurality of inlet ports to feed the hot melt radially inward and through the annular pack of screens, and through a plurality of outlet ports through the inner cylinder which are aligned and registered with the inlet ports in the outer cylinder.

The self-cleaning feature of the apparatus is based on an automatic response to the outlet pressure of the hot melt so that when the pressure drop exceeds a preset limit, the outer cylinder is automatically caused to partially rotate to register an inlet port with an outlet channel whereby hot polymer within the inner cylinder will backflush that inlet port.

Another self-cleaning filter system has recently been introduced by Gneuss Kunststofftechnik GmbH, Oenhausen, Germany, which comprises a plurality of disk type filters disposed in a circular pattern on a disk wheel rotatably mounted between a front and rear end plate. Registered inlet and outlet ports are provided through the end plates so that the hot melt can be passed through one or two of the disk filters disposed between the registered inlet and outlet ports. As the disk filters become clogged, the disk wheel is periodically rotated through a small arc to expose a fresh, clean filter disk or portion thereof, between the inlet and outlet ports as a comparable filter area is rotated out from between the two ports. Each filter disk is eventually rotated to a position not between the two end plates so that a fouled or damaged disk can be removed for cleaning or replacement. In addition, some models rotate the filter disks to a backflush position which is between the two end plates. At this position, a backflush chamber is provided on the back side of a filter disk and a backflush outlet on the other side of the filter disk. A small by-pass port is provided from the outlet port through the back end plate to the backflush chamber to force backflushing hot melt through the filter disk at this position and purge contaminants therefrom. Since a filter disk will always be disposed between the backflush chamber and the backflush outlet port, a shut-off valve is provided on the backflush circuit to minimize the amount of hot melt utilized for backflushing purposes.

SUMMARY OF THE INVENTION

This invention is predicated on a new and improved backflushable, rotary filter apparatus which provides a continuous, uninterrupted flow of hot melt or liquid through all of the plurality of filter elements in the system, which ideally comprise "candle" type filter cartridges to provide a significantly large filter surface area. The filter elements are mounted in a circular, parallel configuration within a rotatable drum, all of which are in service for filtering of hot melt. Upon a partial rotation of the drum, one filter element is revolved through a backflush position to temporarily backflush the entire element sufficiently to purge filtered contaminants completely from the one filter element without removing the other filter elements from service. After a full 360 degree rotation, all the filter elements will have been backflushed one at a time, and returned to service without any interruption of the filter operation. The arrangement is such that any one filter element is only momentarily at the backflush position as the drum is partially rotated so that there is no need for any shut-off valve to minimize the amount of backflush hot melt utilized in backflushing. Accordingly, all filter elements are normally in service for filtering the hot melt, and each successive filter element is completely backflushed automatically with each successive partial rotation of the filter drum without using an excessive amount of hot melt for backflushing purposes and without any need for manual or automatic valves to regulate the amount of hot melt used for backflushing purposes.

The filtration apparatus of this invention backflushes a filter element without even a temporary interruption of the filtering operation. Pursuant to this invention, therefore, there is no need to interrupt the flow of the hot melt or significantly reduce the applied pressure at any time during the operation. Therefore, a rotation cycle can be effected at any desired interval without any need to prolong the rotation cycle time span. It follows therefore, that the rotation cycles can be timed to be at intervals relatively close together to thereby maintain the filter elements in service in a much cleaner condition and able to permit a continuing near optimum output pressure.

It will become apparent that the filtration apparatus of this invention can utilize practically any conventional filter element design including conventional candle-type filter elements; i.e., tubular cartridges or other designs, as opposed to specific and unique filter designs such as annular screen packs. In addition, practically any number individual filter elements in practically any size can be provided, and since all filter elements are normally in service to filter the hot melt, practically any desired filter area can be effected.

Accordingly, the filter apparatus of this invention will permit a truly continuous and automatic use of the apparatus through a large number of filtration and backflushing cycles without need of shutting down the apparatus, or even momentarily halting the flow of hot melt or reducing the outlet pressure of the hot melt below preselected pressures, all without any complicating valve arrangements for controlling the backflush operation.

DETAILED DESCRIPTION OF THE INVENTION

Figure 1:
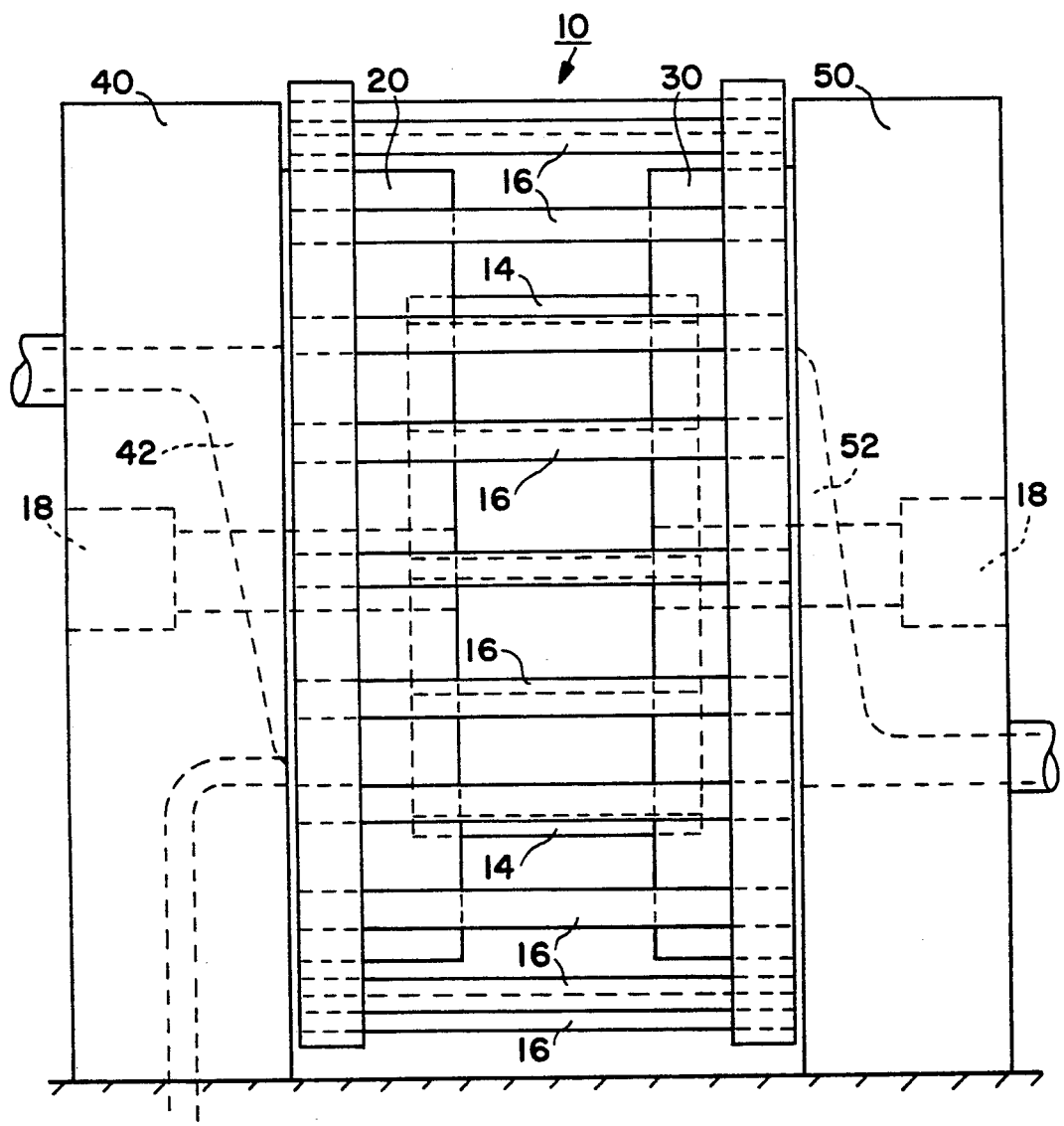
FIG. 1 is an elevational side view of one embodiment of the filter apparatus of this invention utilizing eight candle type filter elements.
Figure 2:
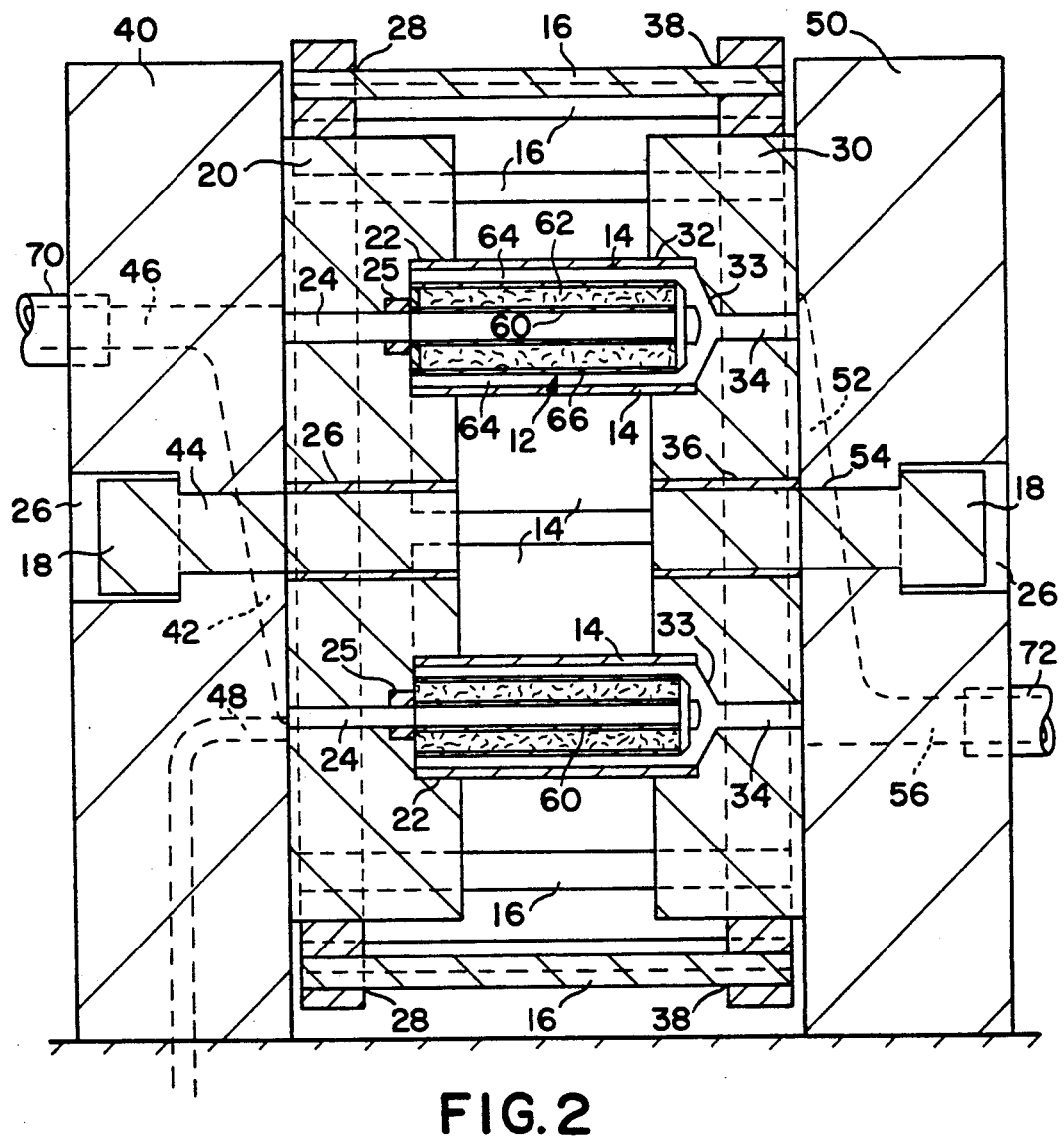
FIG. 2 is a side view identical to that shown in FIG. 1 except that the filter apparatus is shown in cross-section with the section taken at line II—II of FIG. 3.
Figure 3:
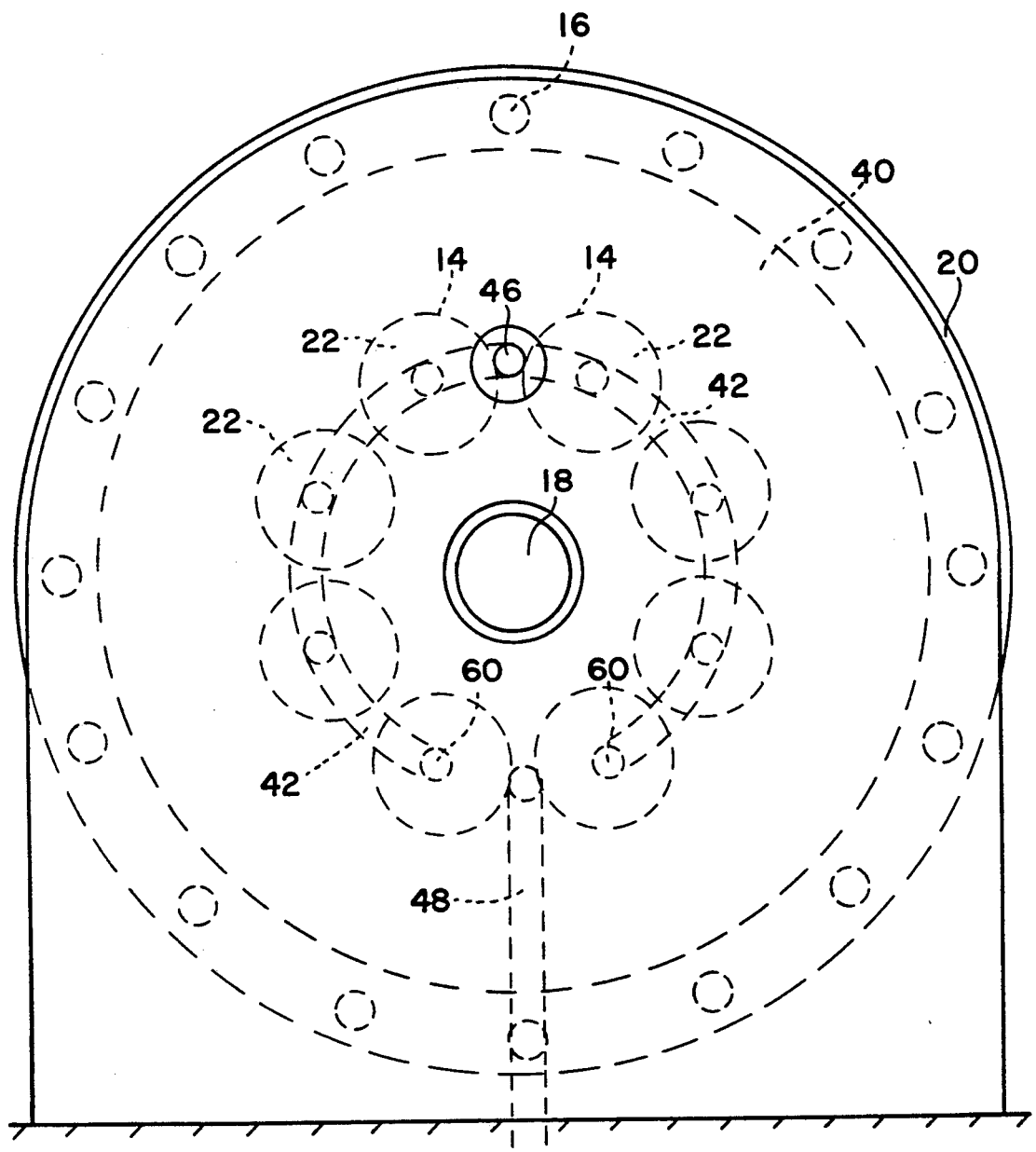
FIG. 3 is an elevational end view of the filter apparatus embodiment shown in FIGS. 1 and 2 as viewed from the inlet end.

Reference to the Figures will illustrate one embodiment of a backflushable, continuous rotary melt polymer filter apparatus constructed in accordance with one embodiment of this invention. As shown in FIGS. 1-3, the filter apparatus illustrated basically comprises a generally cylindrical filter housing 10 containing a plurality of parallel, cylindrically arranged filter elements 12, each disposed within a cylindrical filter sleeve 14. The filter housing 10 comprises an inlet disk 20 and an outlet disk 30 joined together by a plurality of filter housing rods 16 equally spaced around the periphery of the filter housing 10 and rigidly maintaining the inlet disk 20 and outlet disk 30, rigidly positioned with respect to each other. The filter housing 10 is rotatably mounted to trunion posts 18 between a stationary inlet plate 40, provided with an inlet manifold 42, and a stationary outlet plate 50, which is provided with an outlet manifold 52. In the particular embodiment illustrated, there must be twice as many filter housing rods 16 as filter element 12. Therefore, since the embodiment illustrated provides eight filter elements 12 there are sixteen filter housing rods 16. Since the cross-section surfaces illustrated in FIG. 2 pass through the axes of only two filters elements 12, only two filters elements are seen in FIG. 2; namely, only the outer filter elements in the uppermost and lowermost positions.

Figure 11:
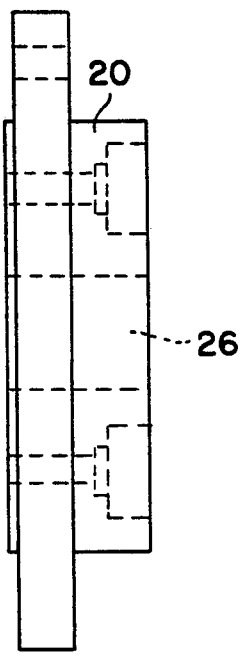
FIG. 11 is a side view of the inlet drum plate shown in FIG. 10.
Figure 10:
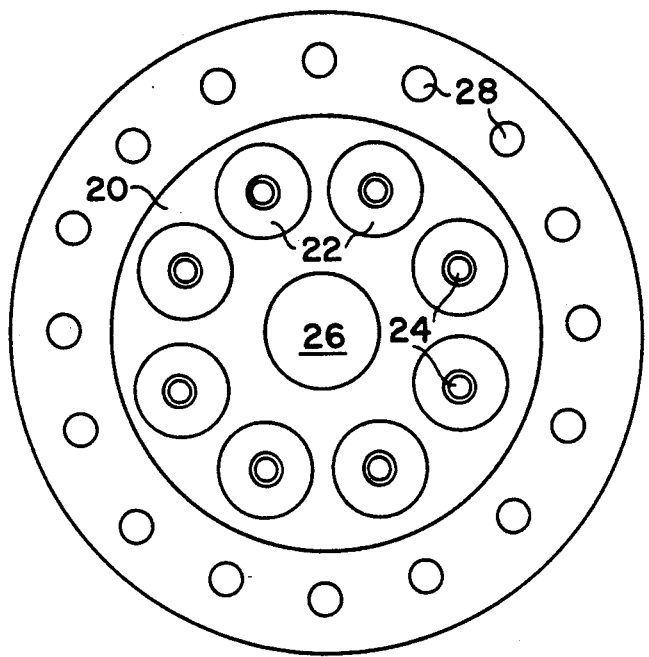
FIG. 10 is an inside view of the inlet drum plate of the embodiment shown in FIGS. 1-3.
Figure 13:
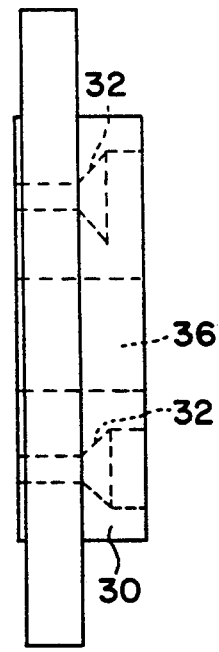
FIG. 13 is a side view of the outlet drum plate shown in FIG. 12.
Figure 12:
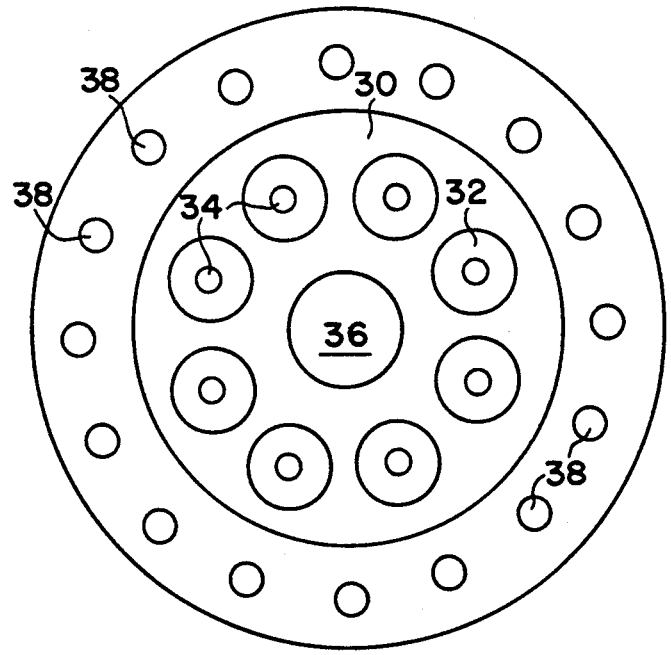
FIG. 12 is an inside view of the outlet drum plate of the embodiment shown in FIGS. 1-3.

Considered in more detail, the rotatable filter housing 10 comprises a circular inlet disk 20 (as illustrated in FIG. 10 and 11) which is provided with eight cylindrical recesses 22 partially extending into the inside face of the inlet disk 20 uniformly positioned in a circular pattern at equal distances from the axis or center of the inlet disk 20. An inlet port 24 extends from the center of the base of each circular recess 22 through the remainder of the disk thickness. Each inlet port 24 is provided with a means to retain one end of an elongated filter element 12, such as a threaded recess 25. A large trunion hole 26 is provided through the axial center of inlet disk 20; and a plurality of smaller filter housing rod holes 28 are provided on a common radius around the periphery, which are equal distant from the trunion hole 26 with each adapted to receive one filter housing rod 16. Filter housing rod holes 28 must be positioned such that one filter housing rod hole each is positioned on a radius line extending through the center of radius of the trunion hole 26 and the center of radius of each cylindrical recess 22, and one filter housing rod hole 28 equally spaced on the same common radius between each filter housing rod hole aligned with the recesses 22. Accordingly, eight parallel cylindrical recesses 22 are provided around trunion hole 26 on a specific radius from the trunion hole 26; and sixteen filter housing rod holes 28 encircle the cylindrical recesses 22, with every other filter housing rod hole 28 positioned on a radius line directly over the cylindrical recesses 22.

The circular outlet disk 30 is adapted to form the opposite end of rotatable drum 10 and is substantially identical to inlet disk 20 except that the eight cylindrical recesses 32 are provided with a conical base surface 33. Accordingly, an outlet port 34 extends from the conical base 33 of each cylindrical recess 32 through the remainder of the disk thickness. A large trunion hole 36 is provided through the axial center of outlet disk 30, while a plurality of smaller filter housing rod holes 38 are provided around the periphery on a common radius which are equal distant from the trunion hole 36 with each adapted to receive the end of one filter housing rod 16. The relative positions of the conical recesses 32 and all holes are the same as those of the cylindrical recesses 22 and all the holes in the inlet disk 20 so that when the two disks are joined and spaced to form the rotatable drum 10, the two trunion holes 26 and 36 will be aligned on the same axis for the rotation of filter housing 10, and one each conical recess 32 will be aligned and registered with one each cylindrical recess 22, and one each filter housing rod hole 38 will be aligned with one each filter housing rod hole 28. Unlike the inlet disk 20, the outlet ports 34 in the outlet disk 30 are not provided with any means for attaching a filter element 12.

When properly assembled, the rotatable drum 10 will have an elongated candle type filter element 12 secured at the base of each cylindrical recess 22 (e.g., by threading an end of the filter element into each threaded recess 25) and positioned to permit inlet ports 24 to communicate with the interior of the perforated support cores 60 (FIG. 3) of the filter elements 12. Ideally, therefore, the diameter of inlet ports 24 should be the same as the inside diameter of filter cores 60 to provide a smooth, unobstructed flow from ports 24 into filter cores 60. Each filter element 12 is surrounded by a filter sleeve 14, the forward ends of which are recessed and sealed within the cylindrical recesses 22 to form a hot melt tight seal, and the rearward ends recessed within cylindrical recesses 32 to again form a hot melt tight seal. The filter housing rods 16 are then positioned around the periphery of the two disks 20 and 30 and tightened to bias them toward each other, thereby sealing filter sleeves 14 in place between the opposed disks 20 and 30. As can be seen in FIG. 2, a hot melt passageway is defined from the inlet ports 24 to the interior of perforated filter support cores 60 so that the hot melt will then move radially outward through the filter medium 62 on the filter elements 12 and into the annular chamber 64 positioned between filter medium 62 and filter sleeves 14. Annular chambers 64 are defined by the cylindrical outer surfaces of the filter elements 12 and the interior surfaces of the filter sleeves 14. From annular chambers 64, the filtered hot melt will pass into outlet ports 34 via the conical recesses 32.

Figure 4:
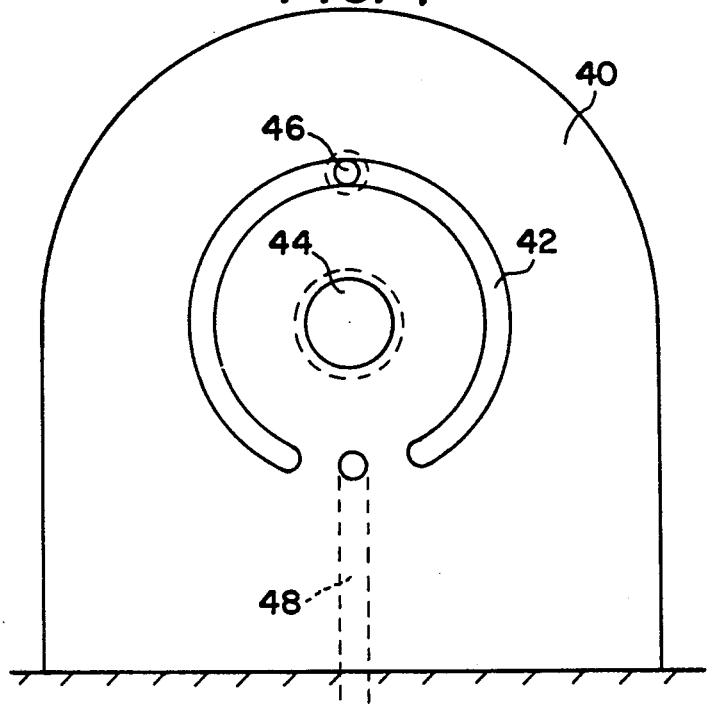
FIG. 4 is an elevational view of the inside face of the inlet end plate of the embodiment shown in FIGS. 1-3.
Figure 8:
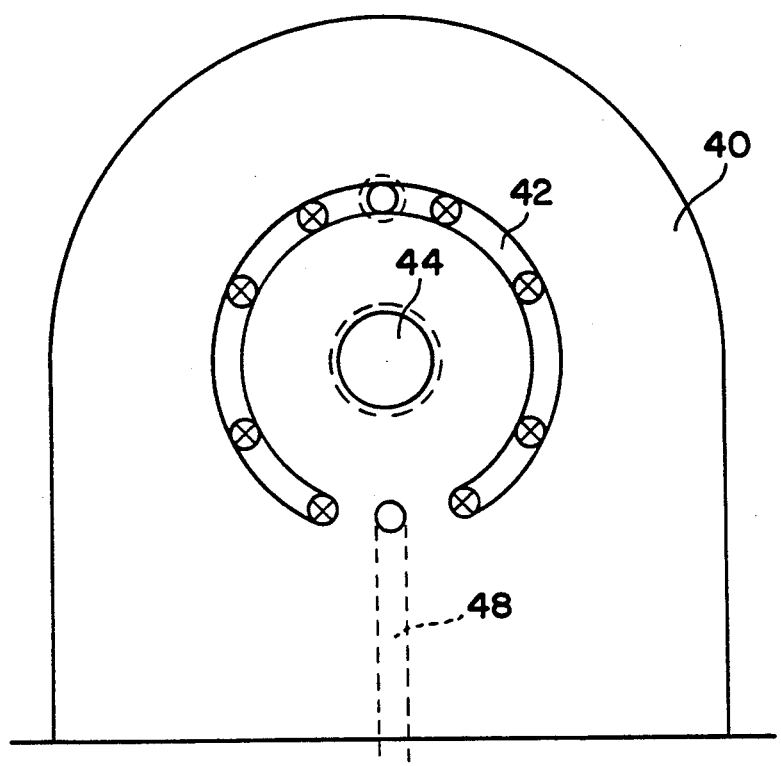
FIG. 8 is substantially the same as FIG. 4 except that it illustrates the relative positions of the filter element inlets with respect to the inlet manifold during a normal filtering operation.

As previously noted, the entire filter housing 10 is adapted for rotation between inlet plate 40 and outlet plate 50 by being rotatably mounted on cylindrical trunion posts 18. As shown in FIGS. 3 and 4, inlet plate 40 is provided with a trunion hole 44 through the center which is adapted to receive a trunion post 18. An inlet manifold 42 is machined into the inside face of inlet plate 40 which comprises a U-shaped channel in an incomplete toroidal configuration partially encircling trunion hole 44. Inlet manifold 42 must be positioned to correspond and communicate with the eight inlet ports 34 through inlet disk 30. A feed inlet port 46 extends entirely through inlet plate 40 communicating with manifold 42 at the upper center portion. As can be seen in FIG. 8, inlet manifold 42 has a channel width which is the same as the diameter of the inlet ports 32. The base of manifold 42 is rounded with a radius equal to the radii of inlet ports 32 and is sloped (FIGS. 2 and 5) so that its cross-sectional area is at a maximum at the upper center portion where the hot melt feed inlet port 46 is positioned, with a progressively decreasing cross-sectional areas moving towards the extremities of manifold 42. The extreme ends of manifold 42 are also rounded with a radius equal to the radii of inlet ports 34 to avoid any dead spaces. Accordingly, the shape and cross-section of manifold 42 is designed to uniformly feed incoming hot melt from feed inlet port 46 into each inlet port 34 and filter core 60 with a minimum of turbulence and pressure differentials and the absence of any dead spaces. A backflush outlet port 48 is provided through the inside face of inlet plate 40 with one opening thereto located at the same radial distance from trunion hole 44 as that of manifold 42 midway between the two extreme ends of manifold 42 so that it will be aligned and registered with each filter element core 60 passing adjacent thereto and the other opening located in the base of inlet plate 40.

Figure 5:
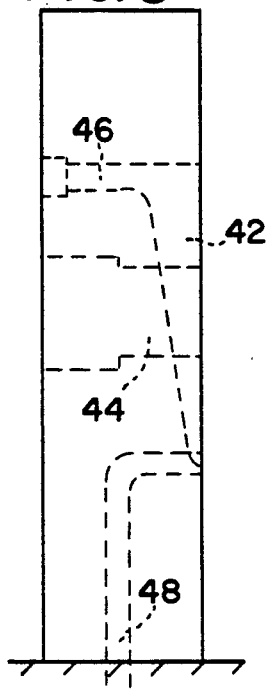
FIG. 5 is a side view of the inlet end plate shown in FIG. 4.
Figure 7:
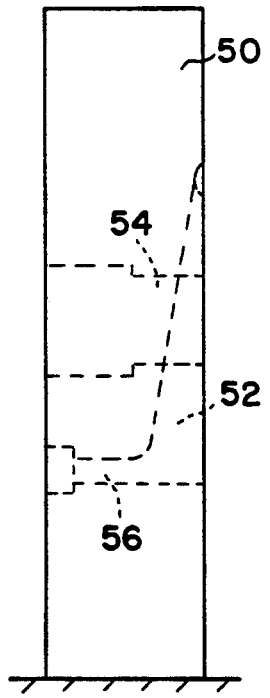
FIG. 7 is a side view of the outlet end plate shown in FIG. 6.
Figure 6:
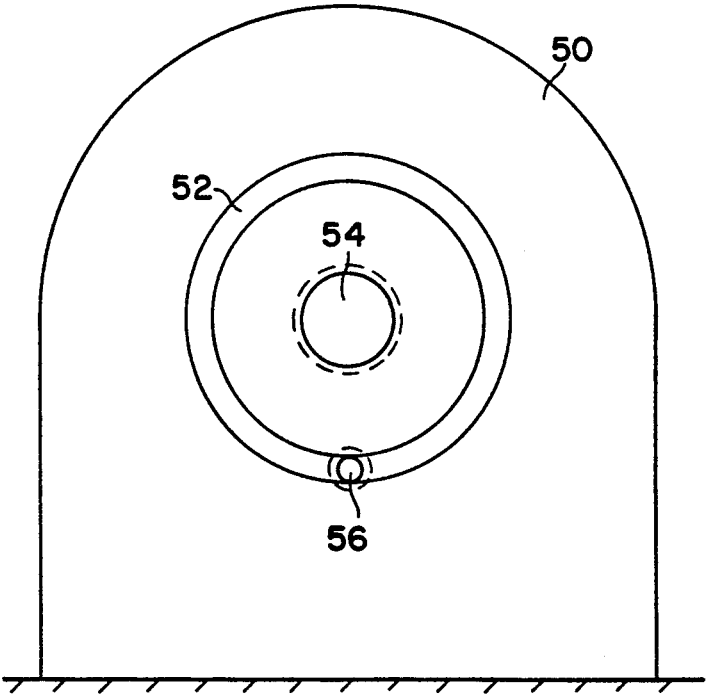
FIG. 6 is an elevational view of the inside face of the outlet end plate of the embodiment shown in FIGS. 1-3.

As shown in FIGS. 5 and 6, the outlet plate 50 is quite similar in configuration to inlet plate 40 having a trunion hole 54 at the center and an outlet manifold 52 having a U-shaped cross-section and toroidal configuration completely encircling the trunion hole 54 with a feed outlet port 56 extending from the base of manifold 52 entirely through outlet plate 50 at the lowermost position. The outlet manifold 52 and outlet feed port 56 in outlet plate 50 are substantially the same as inlet manifold 42 and inlet feed port 46 in inlet plate 40 except that their relative positions of the feed ports 46 and 56 are reversed, and while outlet manifold 52 is in the form of a complete toroidal cavity, inlet manifold 42 is in the form of a truncated or incomplete toroidal cavity. The base of outlet manifold 52 is like inlet manifold 42 in that its base is rounded with a radius equal to that of outlet ports 34 and, as can be seen in FIGS. 5 and 7, the base is sloped so that its cross-sectional area is at a maximum at the lower center portion where the hot melt feed outlet port 56 is positioned, with a progressively decreasing cross-sectional areas moving towards the extremities of manifold 52. Like the inlet manifold 42, the outlet manifold 52 must be positioned to correspond and communicate with the eight outlet ports 34 through outlet disk 30, and shaped to uniformly receive incoming hot melt from outlet ports 34 and feed it into feed outlet port 56 with a minimum of turbulence and pressure differentials and the absence of any dead spaces. In order to avoid any "zero flow" dead space between the two uppermost outlet ports 56, and thus a body of nonmoving hot melt which could become thermally degraded, it is preferred that the point of minimum cross-sectional area in outlet manifold 52 be positioned directly over one of the two uppermost outlet ports 56 to thereby promote some flow of hot melt across this span. Unlike the inlet plate 40, there is no backflush outlet port provided in the outlet plate 50 since the base of outlet manifold 52 does occupy space opposed to backflush port 48 and will function to feed the backflush as will be described subsequently.

Figure 14:
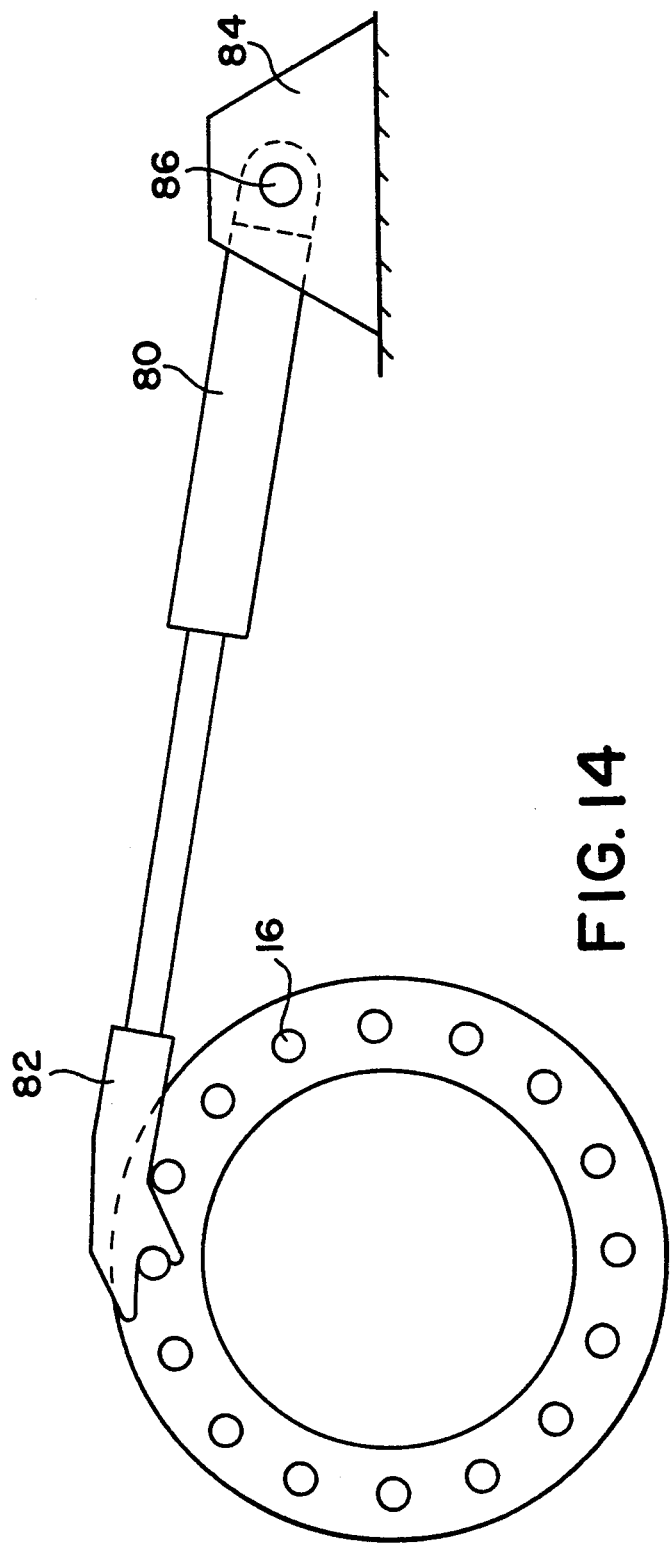
FIG. 14 is an elevational view of an apparatus for rotating the filter drum illustrated in the above Figures.

A means for rotating cylindrical filter housing 10 through a succession of 22.5 degree rotations is also provided which, as shown in the FIG. 14, comprises a hydraulic cylinder 80 activating a push hook 82 against the filter housing rods 16. As can be seen in FIG. 14, hydraulic cylinder 80 is pivotally secured to base member 84 associated with the filter apparatus by pin 86 and horizontally disposed so that push hook 82 can engage one of the upper filter housing rods 16 and push it through a 22.5 degree rotation to thereby position a filter element 12 at the backflush position. Withdrawal of the push hook 82 will cause it to engage the next adjacent filter housing rod 16 so that it too can be pushed through a 22.5 degree rotation to return the backflushed filter element to service.

During normal filter operation, the unfiltered hot melt is fed into the apparatus via suitable piping 70 which will feed the hot melt through inlet feed port 46 and into inlet manifold 42. Reference to FIG. 8 will illustrate the relative positions of the filter element inlets; i.e., the respective filter support cores 60, designated by the circles with an "X" therein. As previously noted, the surfaces of the manifold 42 should be smooth with the base rounded so that the incoming unfiltered hot melt can be most effectively passed into the inlet ports 24 and filter support cores 60 without turbulence and without having any dead spaces. Therefore, the extremity end portions of manifold 42 should be radiused to correspond to and register with the radius of the inlet ports 34 and filter cores 60. In this normal filtering position, there will be no filter element core 60 or inlet port 24 registered with backflush port 48, as is clearly shown in FIG. 8. As is obvious, the hot melt fed into the core 60 of filter elements 12 will be forced to exit therefrom through the annular filter medium 62 disposed around support cores 60 to effectively filter the hot melt as it passes into annular chambers 64. From annular chambers 64, the filtered hot melt will then pass through conical recesses 32 and through outlet ports 34 and into outlet manifold 52. As in the case of the inlet manifold 42, the outlet manifold surfaces should be smooth and rounded so that the outgoing filtered hot melt can be most effectively passed through the outlet manifold 52 and into the outlet conduit 72 without turbulence and without having any dead spaces. Therefore, the extremity end portions of outlet manifold 52 should be radiused to correspond to the radius of the outlet ports 34.

Figure 9:
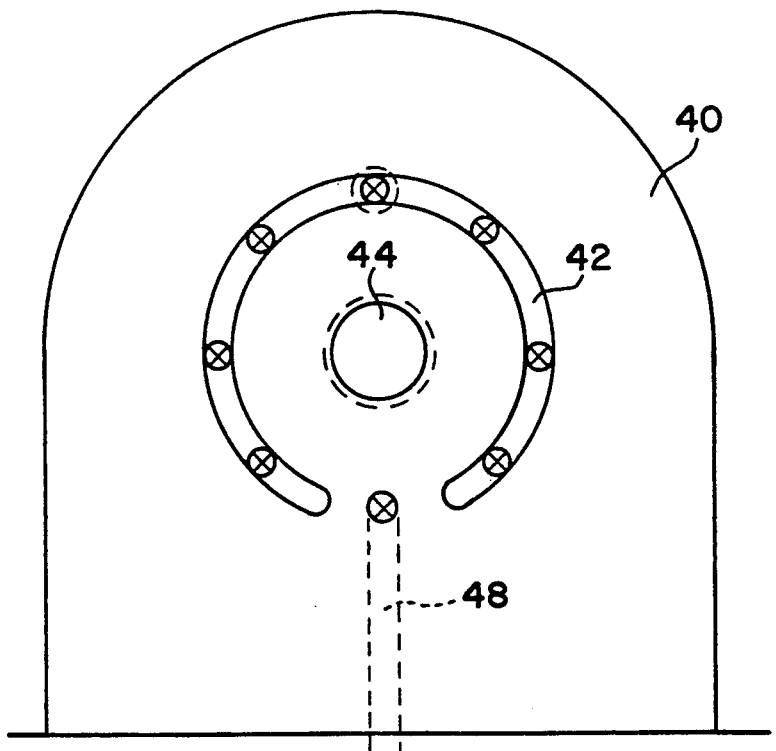
FIG. 9 is substantially the same as FIG. 8 except that it illustrates the relative positions of the filter element inlets with respect to the inlet manifold during the short period of time that a filter element is being backflushed.

During continuous use of the filter apparatus as described above, the filter elements 12 will become progressively fouled and contaminated with contaminants filtered from the hot melt, with the contaminants collecting at the inside peripheral surfaces of the filter medium 62. To effect a backflush operation, the filter housing 10 must be revolved through a 22.5 degree rotation so that one inlet port 24 and filter element core 60 is revolved from the extreme end of manifold 42 and aligned and registered with the backflush outlet port 48, as depicted in FIG. 9. In contrast to FIG. 8, FIG. 9 depicts the positions of the filter element cores 60 with respect to the inlet manifold 42 during a backflush operation, with the positions of the filter element cores 60 depicted by the circles containing an "X". Accordingly, the one inlet port 24 at this lowermost position is no longer registered with the inlet manifold 42; but the associated outlet port 34 remains registered with the outlet manifold 52. In this position the pressure of the filtered hot melt within the outlet manifold 52 will force a small portion of the filtered hot melt to flow backwards through the lowermost outlet port 34 and associated conical recess 32, and chamber 64, and radially inward through the lowermost filter medium 62 backflushing the contaminants from the inner surfaces of the medium and washing the contaminants out of the apparatus through backflush outlet port 48. From outlet port 48 the contaminated hot melt can be returned to the upstream portion of the manufacturing facility for further processing, or discarded depending on operator preferences. It should be apparent that until such time as a filter element core 60 becomes aligned with the backflush port 48 at the lowermost position of the drum rotation, no filtered hot melt can be backflushed through backflush port 48. It should also be noted that in the backflushing position, inlet ports 24 are not positioned at the extreme ends of the inlet manifolds 42, thereby providing a small dead space at the extreme ends of the manifold. However, since the backflushing operation is rather brief, as discussed below, the dead spaces created during the backflushing operation are of no adverse consequence.

Experience has shown that the backflushing operation is very quickly achieved to effectively purge the filter element of most contaminates. Therefore, it is not necessary to leave the backflushed filter element in the backflush position for more than a few seconds before the filter housing 10 is rotated through and additional 22.5 degrees to reposition all filter elements 12 in the normal operating position as depicted by FIG. 8. Accordingly, a filter element rotated to the lowermost position can be rather quickly backflushed and rotated again returning it to service as a cleaned (i.e., backflushed) filter element. Even during that short period of time while one filter element is being backflushed, it can be seen that the filtration operation will continue through the other seven filter elements not in the backflush position. Accordingly, the backflushing operation does not represent any interruption in the filtering operation; and since the backflush time is rather short, and backflushing does not normally reduce the hot melt pressure by any significant amount.

In normal operation, it is preferred that the rotation interval be determined automatically on the basis of back pressure created by the slow clogging of the filter elements. Accordingly, when pressure is reduced to a predetermined level, the filter housing 10 is automatically rotated through 22.5 degrees, positioning one filter element at the lowermost rotation position to backflush that filter element, and then rotated an additional 22.5 degrees to return the filter element back into service. With one cleaned filter element returned to service, the feed pressure will increase until the total filter area again becomes sufficiently clogged to cause another rotation and another filter element to be backflushed and returned to service, and so on. Obviously, each partial rotation of filter housing 10 should be in the same direction so that each succeeding filter element will be backflushed. As can be seen, each rotation of filter housing 10 through a ⅛ full circle turn; i.e., 45 degrees, will cause each of the filter elements 12 and associated inlet and outlet ports to be rotated; i.e., shifted to the next adjacent normal filtering position. Accordingly, as a fresh, backflushed filter element is first rotated into position where it will be aligned with the two manifolds 42 and 52 so that it will filter the incoming hot melt in combination with the other seven filter elements so aligned, it will remain in service through seven more partial rotations before it is again removed from service for backflushing. As each filter element is removed from service it will be the only one that has gone through seven partial rotations, and accordingly, will be the most fouled of the filters in service and the one most in need of backflushing.

With regard to the filter elements 12, it should be apparent that if candle-type filter elements are utilized, their structure will have to be somewhat different from those conventionally utilized in other forms of filtering apparatus. This is because conventional candle-type filter elements are normally utilized in equipment that utilizes only one direction of flow of the hot melt which is normally radially inward through the filter medium supported against a tubular filter core member. In the apparatus of this invention, however, the hot melt will have to flow through the filter medium at high pressure in both directions. Therefore, no matter what filter medium is utilized, it will have to be supported on both sides so that the medium is not dislodged from the support. As depicted in FIG. 3, the filter elements 12 are shown to have a support tube on both sides of the filter medium 62; i.e., a conventional tubular filter core 60 on which the filter medium 62 is supported from the inside, and a perforated outer support tube or jacket 66 against the outer surface of the medium 62. Accordingly, filter elements 12, as depicted, are well adapted to withstand the vigors of the two-way hot melt flow. The blunt forward ends of filter elements 12 are preferably provided with a conical or rounded tip for the purpose of guiding the hot melt through the conical recess 32 with a minimum of turbulence. In a like manner, inner-cones (not shown) can be provided within filter cones 60 as may be necessary to occupy volume and reduce turbulence within the cores 60.

In addition to the above described features of the filter apparatus of this invention, it should be obvious that additional components will be required, such as associated conduit lines for feeding the hot melt to and from the filter apparatus, heating means for keeping a hot melt at temperature, and means for coupling the components together as necessary to maintain tight interfaces of the component parts and yet permit rotation of the filter housing 10 without any leaking of the hot melt at the interfaces between the stationary and rotating parts. Such connecting means, including adjustable interface pressure controlling means, are within the skill of the art and need not therefore be described here.

It should be apparent from the above description that numerous modifications and alternate embodiments could be utilized without departing from the spirit of the invention. For example, while an eight filter element apparatus has been depicted in the above described detailed embodiments, it is apparent that any desired number of multiple filter elements could be incorporated, provided all are equally spaced on a given radius from the axis of rotation so that each partial rotation will cause the successive filter elements to be revolved through the backflush position and returned to service. As another alternative, it should be appreciated that the filter apparatus can include more than one circular arrangement of filter elements. For example, two or more concentric arrangements can be provided with individual and concentric inlet and outlet manifolds, or one each of said manifolds which extend to the plural circular arrangements. Such an arrangement could backflush two filter at a time, one from each concentric circular arrangement, or backflush one filter at a time by properly staggering the backflush outlet ports.

It should also be apparent that a large number of differing arrangements could be utilized to mount the filter elements and filter sleeves to effect hot melt passageway through the filter housing. Even a one-piece housing could be utilized having a plurality of filter sleeves machined therethrough, or other techniques utilized to seal the ends of individual sleeves. As another example, more than one backflush position can be provided if such is desired for any reason, as well as incorporating one or more "dead" positions where the filters therein are neither in service nor being backflushed, should such be desired. It should also be appreciated that while elongated candle-type filter elements have been depicted in the above description, practically any type of filter element can be utilized by suitably modifying the housing to accommodate such a modified filter element. While candle-type filter elements will provide a comparatively large filter area, it should be appreciated that in applications where large filter areas are not necessary, the use of other types of filter elements will provide for a significantly reduced depth of the cylindrical filter housing.

In addition to the above considerations, it has already been noted that in most prior art filtration apparatus utilizing candle-type filter elements, the normal practice is to utilize a filter element having a perforated core upon which the filter medium is supported, and then passing the liquid to be filtered radially inward through the filter medium and into the area defined by the core. This structure is ideal for one-way applications in that the core will physically support the body of the medium and expose the outer surface of the medium for filtration (which naturally has the greater surface area) and therefore increases the life of the filter. In the filter elements of this invention, however, the medium must be supported on both sides in view of the fact that the hot melt will be passed through the filter medium in both directions; i.e., in one direction for filtering, and in the opposite direction for backflushing. While the above-described embodiment of the invention filters the hot melt as it is passing radially outward through the medium, the reverse arrangement could be utilized, which would in fact provide a larger filter medium surface area. The arrangement as described-above has been preferred, however, because it has been found that the contaminants are more easily purged from the apparatus through the core 60, as opposed to the annular chamber 64. Furthermore, since the apparatus is basically intended to clean the filter elements and return them to service, the reduced filter medium surface area is not detrimental to the overall life of the filter elements. Additionally, the above-described embodiment has utilized candle type filter elements whereby only one end is secured, i.e., the forward end secured to inlet disk 20. Obviously, other means for securing the individual filter elements could be utilized, such as mounting them to the outlet disk 30, or to both the inlet and outlet disks, or to the sleeve 14.

It should further be appreciated that the above described method for rotating the cylindrical filter housing utilizing a hydraulic cylinder represents but one technique out of many that could be utilized. Other examples could include the provision of ratchet teeth on the filter housing instead of filter housing rods, or an electric motor with suitable gear linkage or chain linkage, as well as others which are within the skill of the art and need not be described here.

While the above description of the apparatus of this invention has been primarily addressed to the use of the apparatus in filtering polymer hot melts, it should be apparent that the apparatus could be utilized in any type of process to filter any material where continuous filtration and backflushing would be helpful.

What is claimed is:

1. A continuous, self-cleaning, filter apparatus for filtering a liquid material comprising: a filter housing constructed and arranged for rotational motion about an axis of said filter housing, having an inlet manifold and an outlet manifold, a plurality of filter elements disposed in a circular pattern around said axis, secured within said filter housing each of said plurality having an inlet means adjacent to said inlet member and an outlet means adjacent to said outlet member, said inlet member having an inlet manifold sufficient to communicate with each said inlet means when said filter housing is rotationally positioned at a full filtering position, said inlet manifold defines a partial toroidal cavity, a circular side of which is registered and in communication with each of said inlet means when said filter housing is rotationally positioned at a full filtering position said outlet manifold sufficient to communicate with each said outlet means, means for introducing a liquid to be filtered into said inlet manifold so that said liquid will pass through said inlet means and said filter elements to filter contaminants therefrom and thereafter pass through said outlet means into said outlet manifold, means to permit said liquid to exit from said outlet manifold, and means for partially rotating said filter housing with respect to said inlet manifold to rotate one of said filter elements to a backflush position wherein the inlet means of said one filter element will be aligned with a backflush port within said inlet member independent of said inlet manifold, thereby causing a portion of said liquid within said outlet manifold to flow through said filter element in a direction opposite to the direction of flow during filtration at said backflush position to flush contaminants from said one filter element and purge said contaminants from the apparatus via said backflush port, and thereafter to further rotate the backflushed filter element into communication with said inlet manifold and full filtering position.

2. A filtering apparatus according to claim 1 in which said inlet manifold has a width equal to the width of said inlet means, and has a sloped base so that said liquid can pass through said inlet manifold with a minimum of turbulence, pressure variation, and no significant dead spaces.

3. A filtering apparatus according to claim 1 in which said outlet manifold defines a full toroidal cavity, a circular a side of which is registered and in communication with each of said inlet means.

4. A filtering apparatus according to claim 3 in which said outlet manifold has a width equal to the width of said outlet means, and has a sloped base so that said liquid can pass through said outlet manifold with a minimum of turbulence, pressure variation, and no significant dead spaces; and said outlet manifold has a width equal to the width of said outlet means;

5. A filtering apparatus according to claim 1 in which said inlet member is an inlet plate and said inlet manifold is machined into the face of said inlet plate, and said outlet member is an outlet plate and said outlet manifold is machined into the face of said outlet plate.

6. A filtering apparatus according to claim 1 in which said filter housing comprises a generally cylindrical housing structure having an inlet disk adjacent to said inlet member and an outlet disk adjacent to said outlet member, a plurality of filter sleeves disposed between said inlet member and said outlet member, and a filter element disposed within each of said filter sleeves.

7. A filtering apparatus according to claim 6 in which said inlet disk is provided with a plurality of inlet ports constructed and arranged to be aligned and registered with said inlet manifold while said filter housing is rotationally positioned at full filtering position to permit passage of said liquid from said inlet manifold through said filter elements, and said outlet disk is provided with a plurality of outlet ports constructed and arranged to be aligned and registered with said outlet manifold to permit passage of said liquid from said filter elements into said outlet manifold.

8. A filtering apparatus according to claim 7 in which said filter elements are attached to said inlet ports.

9. A filtering apparatus according to claim 7 in which said filter elements comprise elongated candle-type filter elements.

10. A filtering apparatus according to claim 9 in which said filter elements comprise an elongated perforated core, a filter medium supported on said core, and a perforated jacket surrounding said filter medium.

11. A filtering apparatus according to claim 10 in which said inlet ports are constructed and arranged to convey the liquid to be filtered into the interior of said perforated core, thereby permitting said liquid to be filtered as it passes radially outward through said filter medium.

12. A filtering apparatus according to claim 1 in which said filter housing further comprises a plurality of filter housing rods disposed around the periphery of said filter housing having their axes parallel to said axis and interposed between said inlet disk and said outlet disk.

13. A filtering apparatus according to claim 12 in which said means for partially rotating said filter housing functions by releasably and sequentially engaging said filter housing rods.

14. A filtering apparatus according to claim 13 in which said means for partially rotating said filter housing comprises a hydraulic cylinder constructed and arranged to engage one of said filter housing rods to hydraulically cause said partial rotation, and thereafter engage the next adjacent filter housing rod to effect the next partial rotation.

15. A filtering apparatus according to claim 1 in which said means for partially rotating said filter housing comprises a hydraulic cylinder.

16. A continuous, self-cleaning, filter apparatus for filtering a liquid material comprising: a generally cylindrical filter housing constructed and arranged for rotational motion about an axis of said filter housing between a stationary inlet plate and a stationary outlet plate, a plurality of filter elements secured within said filter housing arranged in a circular pattern and uniformly spaced from said axis, said filter housing having an inlet port adjacent to each filter element each of which inlet ports are adjacent to said inlet plate, said filter housing having an outlet port adjacent to each filter element each of which outlet ports are adjacent to said outlet plate, said inlet plate having an inlet manifold formed into a face thereof said inlet manifold defines a partial toroidal cavity, a circular side of which is registered and in communication with each of said inlet means when said filter housing is rotationally positioned at a full filtering position sufficient to communicate with each said inlet ports when said filter housing is rotationally positioned at a full filtering position, said outlet plate having an outlet manifold formed into a face thereof sufficient to communicate with each said outlet ports, inlet means for introducing a liquid to be filtered into said inlet manifold so that said liquid will pass through said inlet ports and said filter elements to filter contaminants therefrom and thereafter enter through said outlet ports into said outlet manifold, means to permit said liquid to exit from said outlet manifold, and means for partially rotating said filter housing with respect to said inlet plate and said outlet plate sufficient firstly to permit at least one of said filter elements to be rotated to a backflush position wherein the inlet port of said filter element will be aligned and registered with a backflush port within said inlet plate independent of said inlet manifold, thereby causing a portion of said liquid within said outlet manifold to backflow through said filter element at said backflush position to backflush contaminants from said filter element and purge said contaminants from the apparatus via said backflush port, and secondly to further rotate the backflushed filter element into communication with said inlet manifold and full filtering position.

17. A filter apparatus according to claim 16 in which said toroidal cavity has a u-shaped cross-section, whereby a circular side of aid cavity is registered with all of said inlet ports when said filter housing is rotationally positioned at a full filtering position.

18. A filter apparatus according to claim 16 in which said outlet manifold defines a full toroidal cavity having a u-shaped cross-section, whereby a circular side of said cavity is registered with all of said outlet ports, regardless of the rotational position of said filter housing.

* * * * *